United States Patent [19]

Wigley et al.

[11] 4,187,535

[45] Feb. 5, 1980

[54] VOLTAGE POWER SUPPLY

[75] Inventors: Patrick A. Wigley; Edwin L. Dana, both of Sunnyvale; Alfred Pletz, Jr., Milpitas, all of Calif.

[73] Assignee: CPS, Inc., Sunnyvale, Calif.

[21] Appl. No.: 892,132

[22] Filed: Mar. 31, 1978

[51] Int. Cl.$^2$ ............................................ H02M 3/335
[52] U.S. Cl. ........................................ 363/16; 363/60; 358/190
[58] Field of Search ..................... 363/15, 16, 59–61, 363/24–26, 97; 358/190

[56] References Cited

U.S. PATENT DOCUMENTS

| | | | |
|---|---|---|---|
| 3,402,342 | 9/1968 | Wagner | 363/26 X |
| 3,553,459 | 1/1971 | Siedband | 363/59 X |
| 3,573,595 | 4/1971 | Galluppi | 363/23 |
| 4,013,936 | 3/1977 | Hesler et al. | 363/25 |

*Primary Examiner*—J. D. Miller
*Assistant Examiner*—Peter S. Wong

*Attorney, Agent, or Firm*—Flehr, Hohbach, Test, Albritton & Herbert

[57] ABSTRACT

A voltage power supply, particularly one which is especially suitable for providing a relatively high DC voltage output of rapidly changing amplitude adapted to drive a cathode ray tube (CRT), is disclosed herein. This voltage supply includes circuitry adapted for connection to a relatively low amplitude (actually magnitude) DC voltage input for first converting this input to an AC voltage output and then converting the AC voltage output to a DC drive voltage having a fixed amplitude substantially higher than the DC voltage input. This higher amplitude DC voltage is applied to voltage varying circuitry, specifically a pullup and pulldown circuit arrangement, for producing at its output an adjustable DC output voltage having an amplitude which does not exceed the amplitude of the drive voltage. A voltage adjusting circuit is connected to this latter circuit arrangement and is also adapted for connection to a coded signal for rapidly changing the amplitude of the adjustable output voltage in response thereto.

29 Claims, 15 Drawing Figures

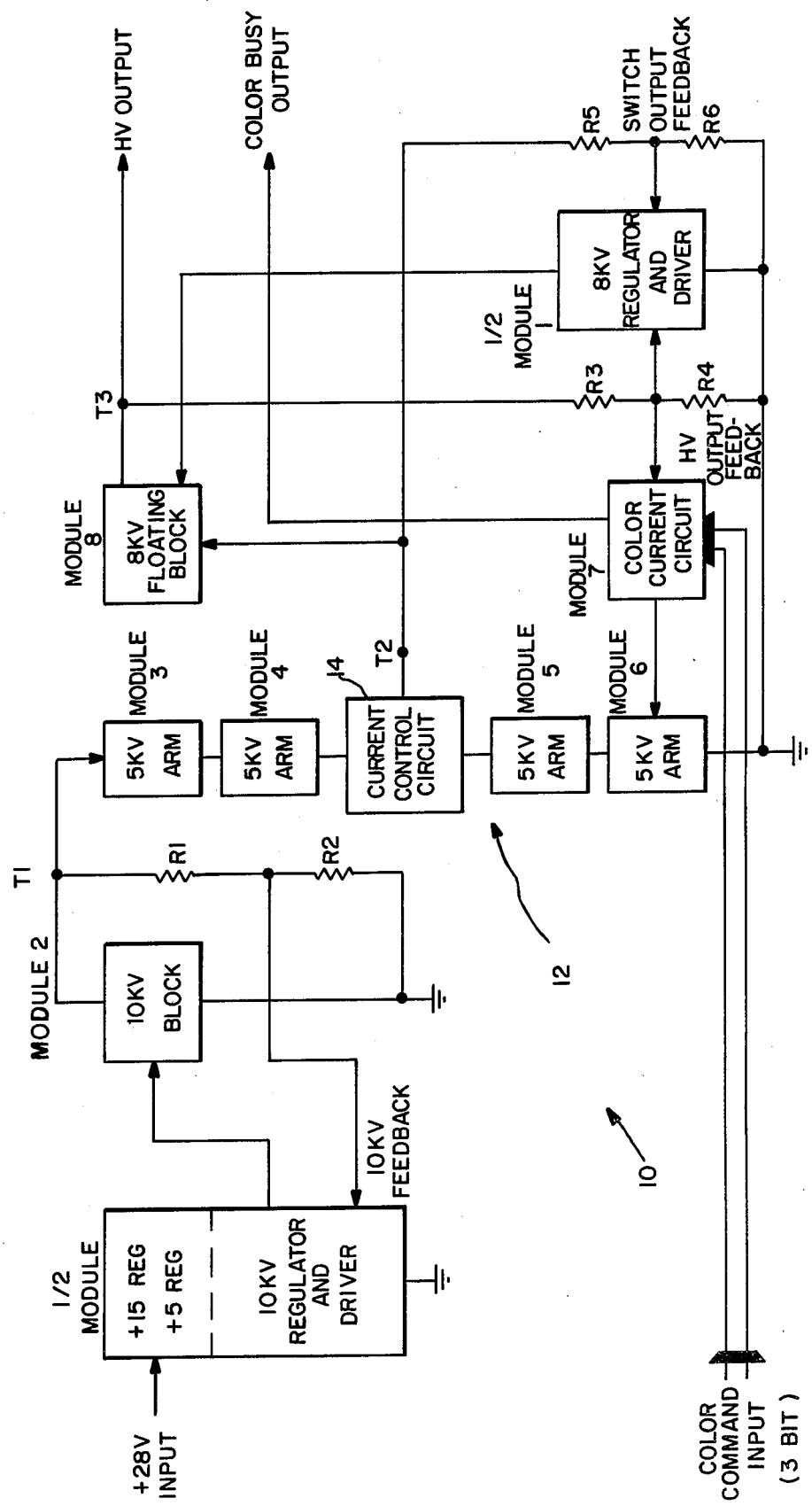
FIG.—1

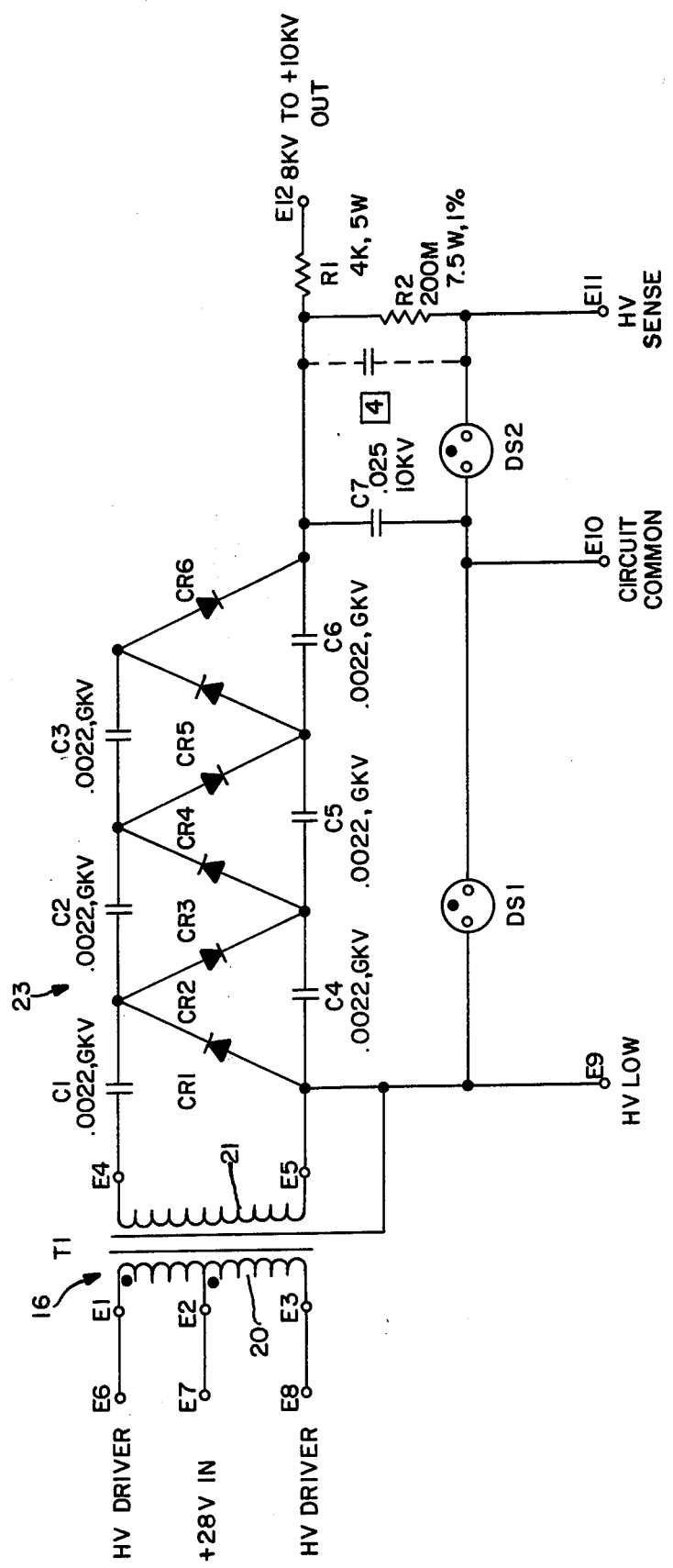
FIG.—3

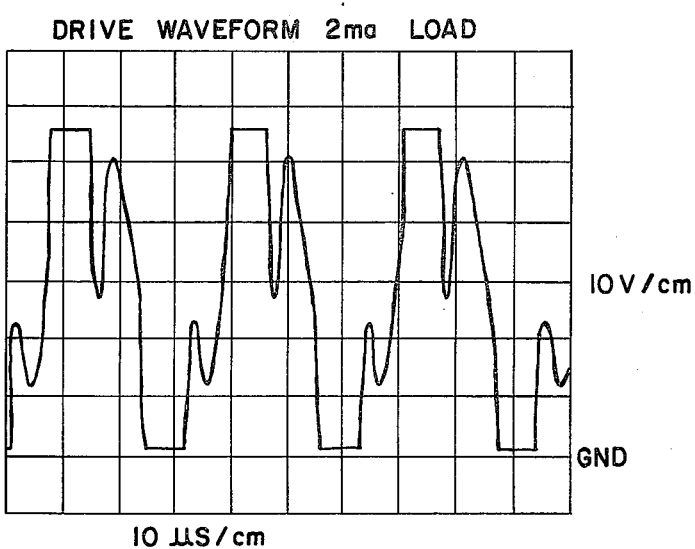
FIG.—4
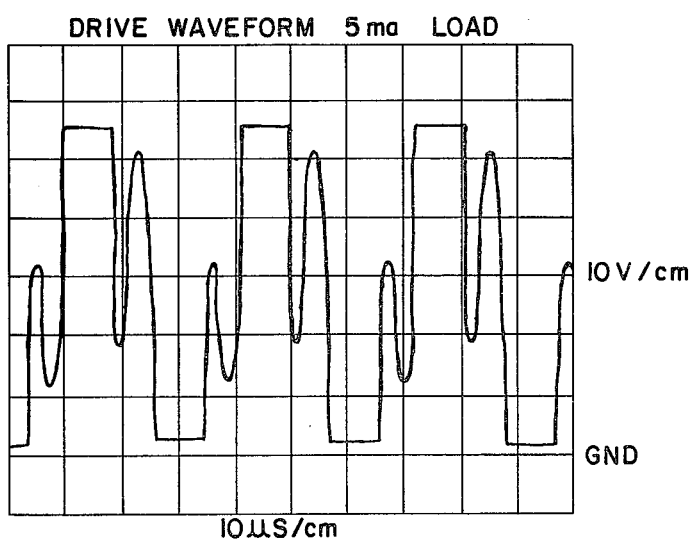
FIG.—5

FIG. — 6
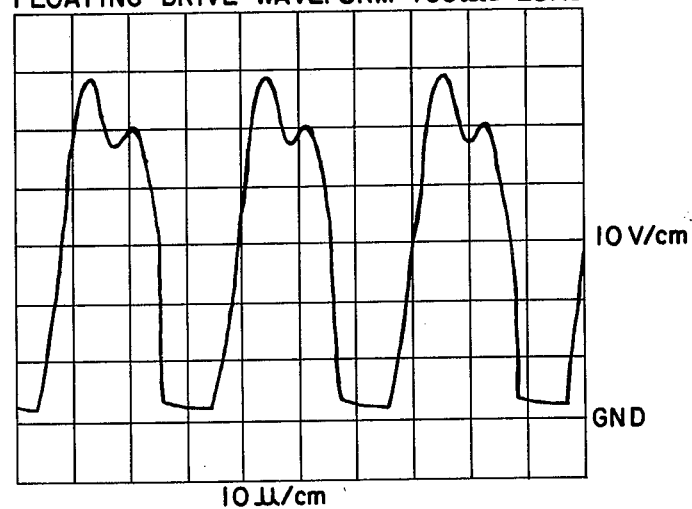
FIG. — 7

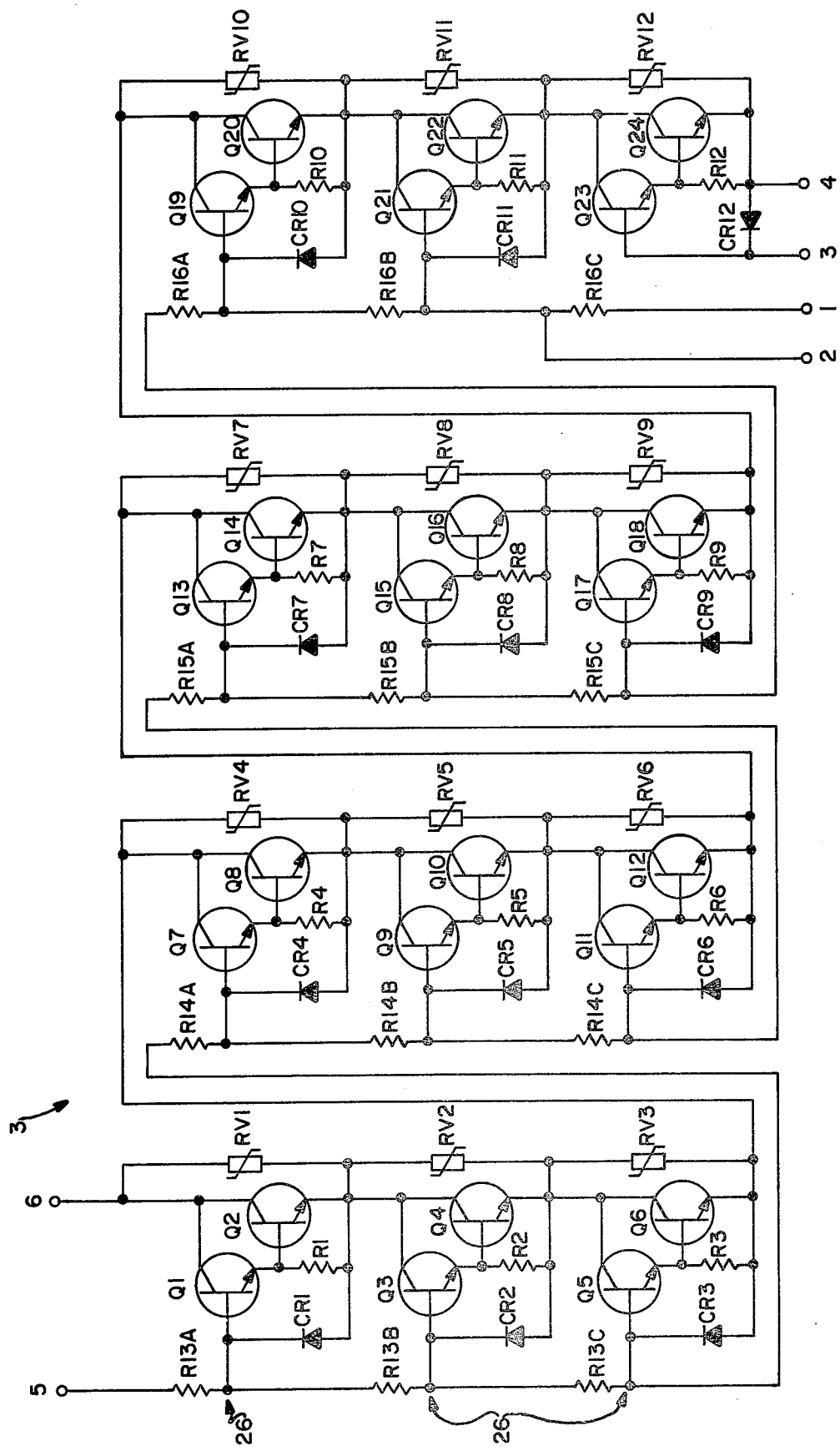
FIG.—8

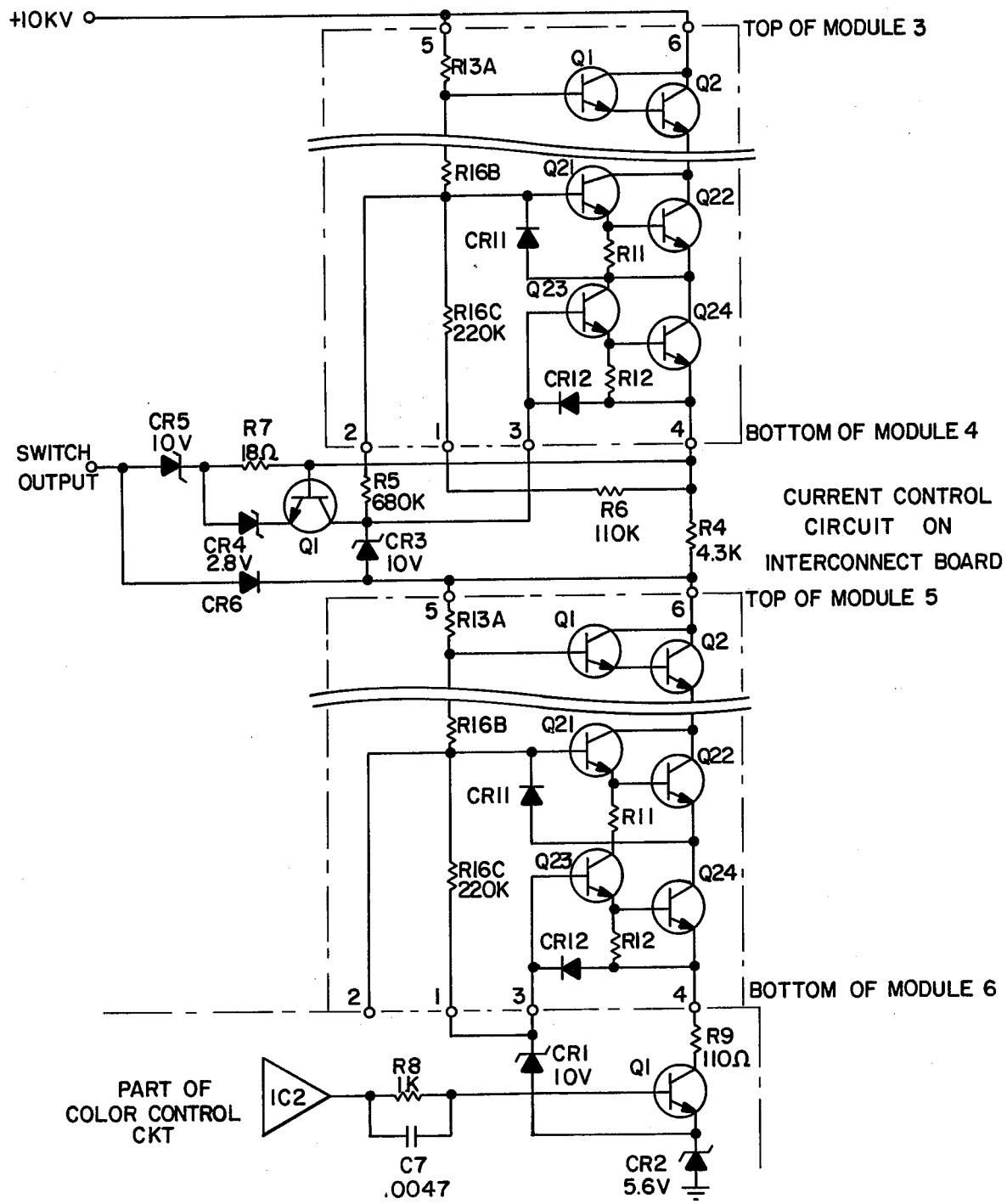
FIG.—9

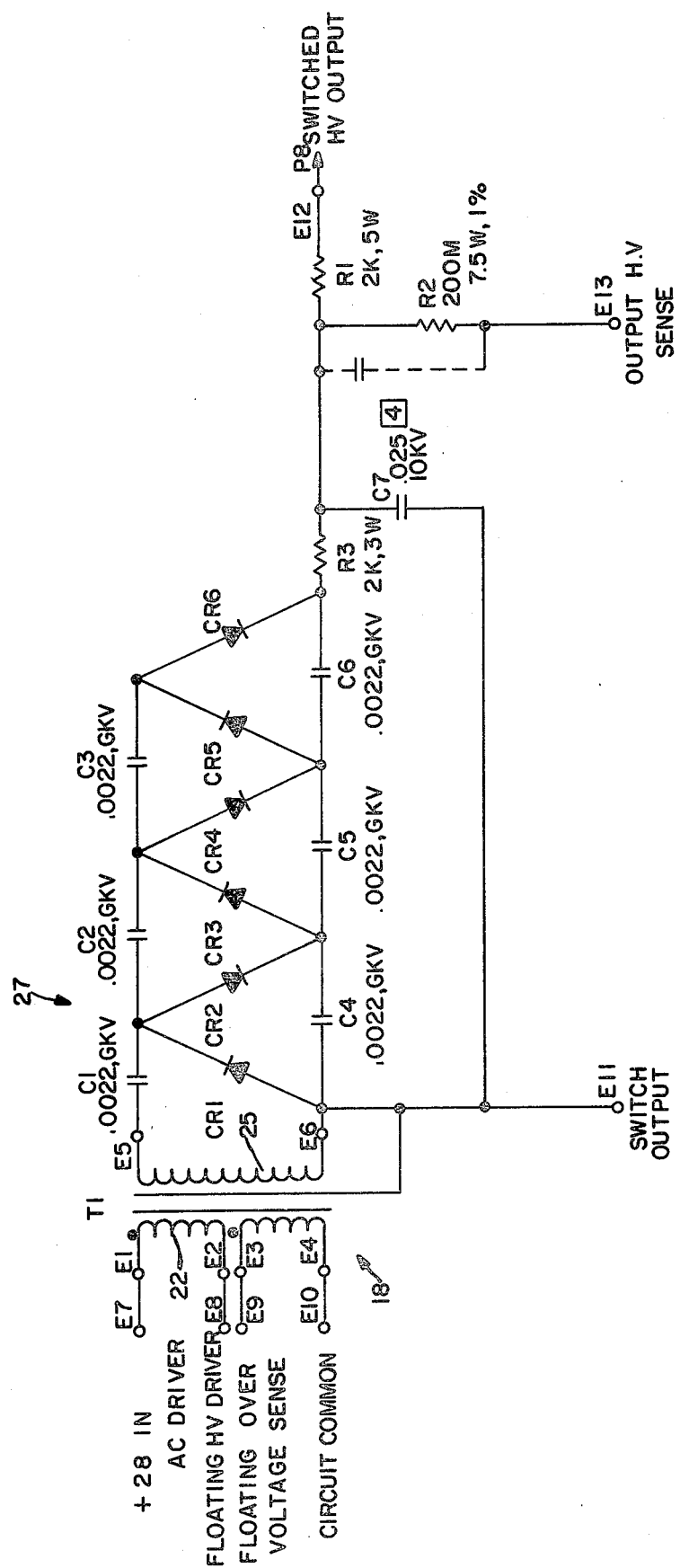
FIG.—10

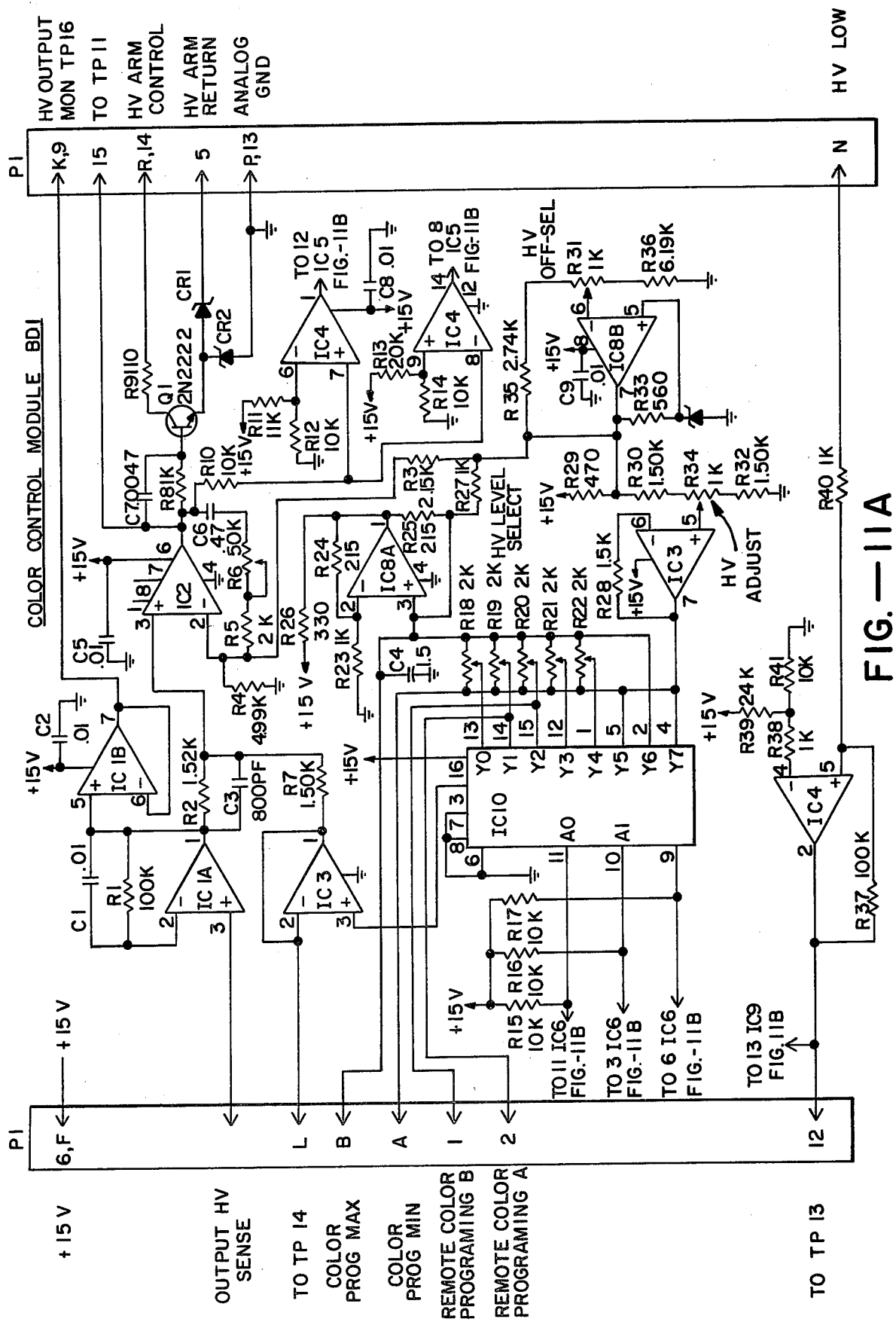
FIG.—11A

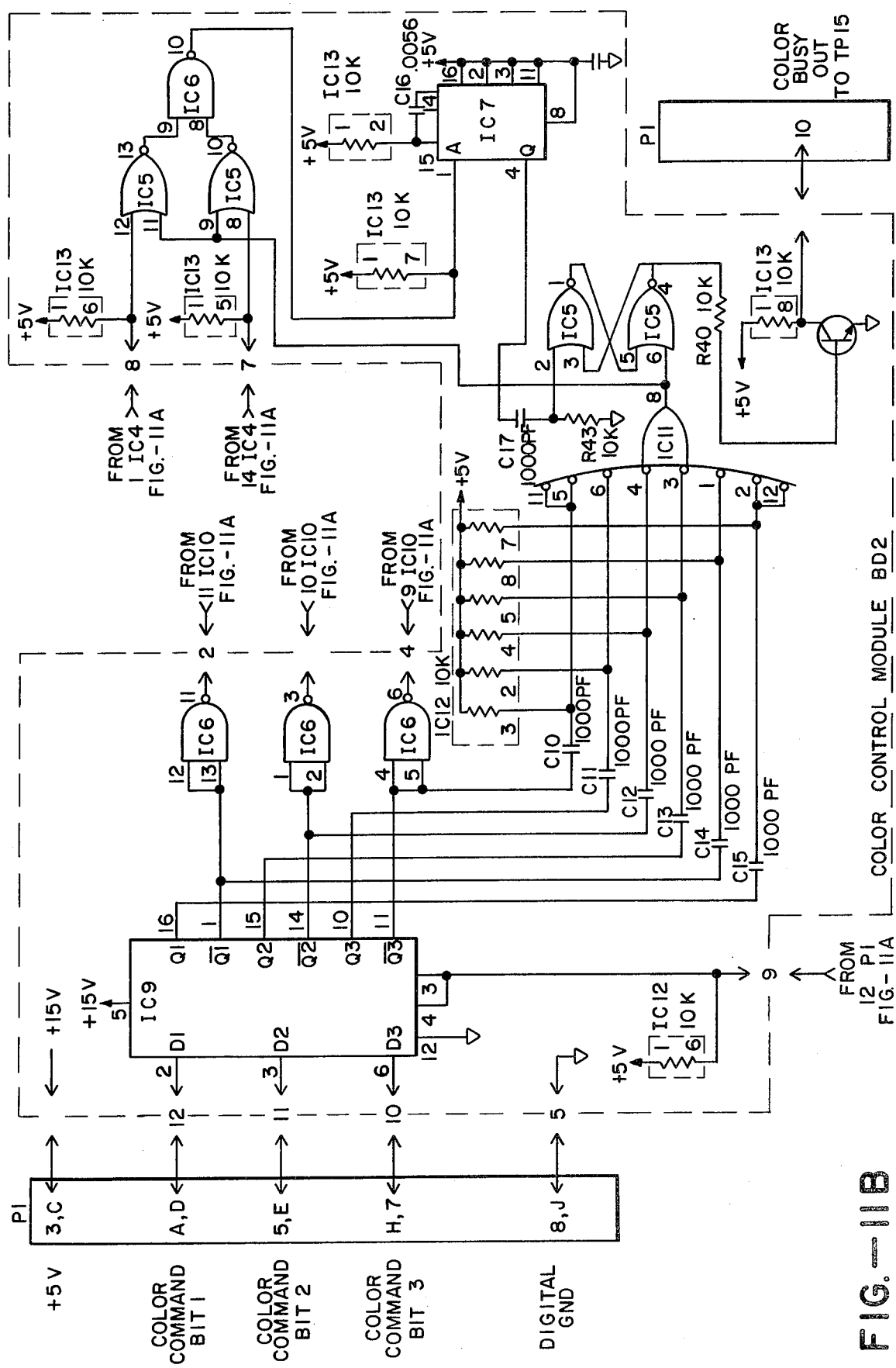

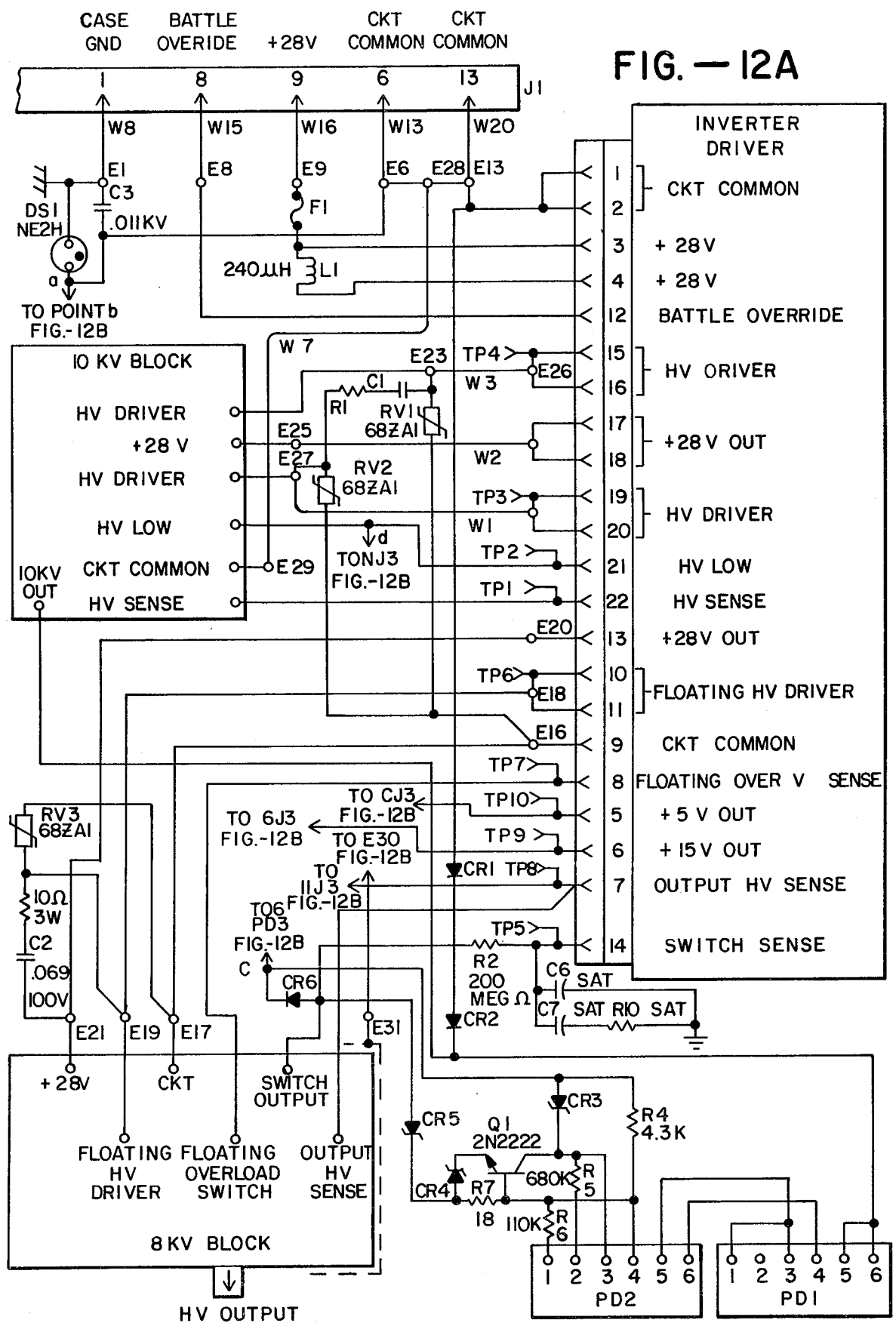
FIG.—12A

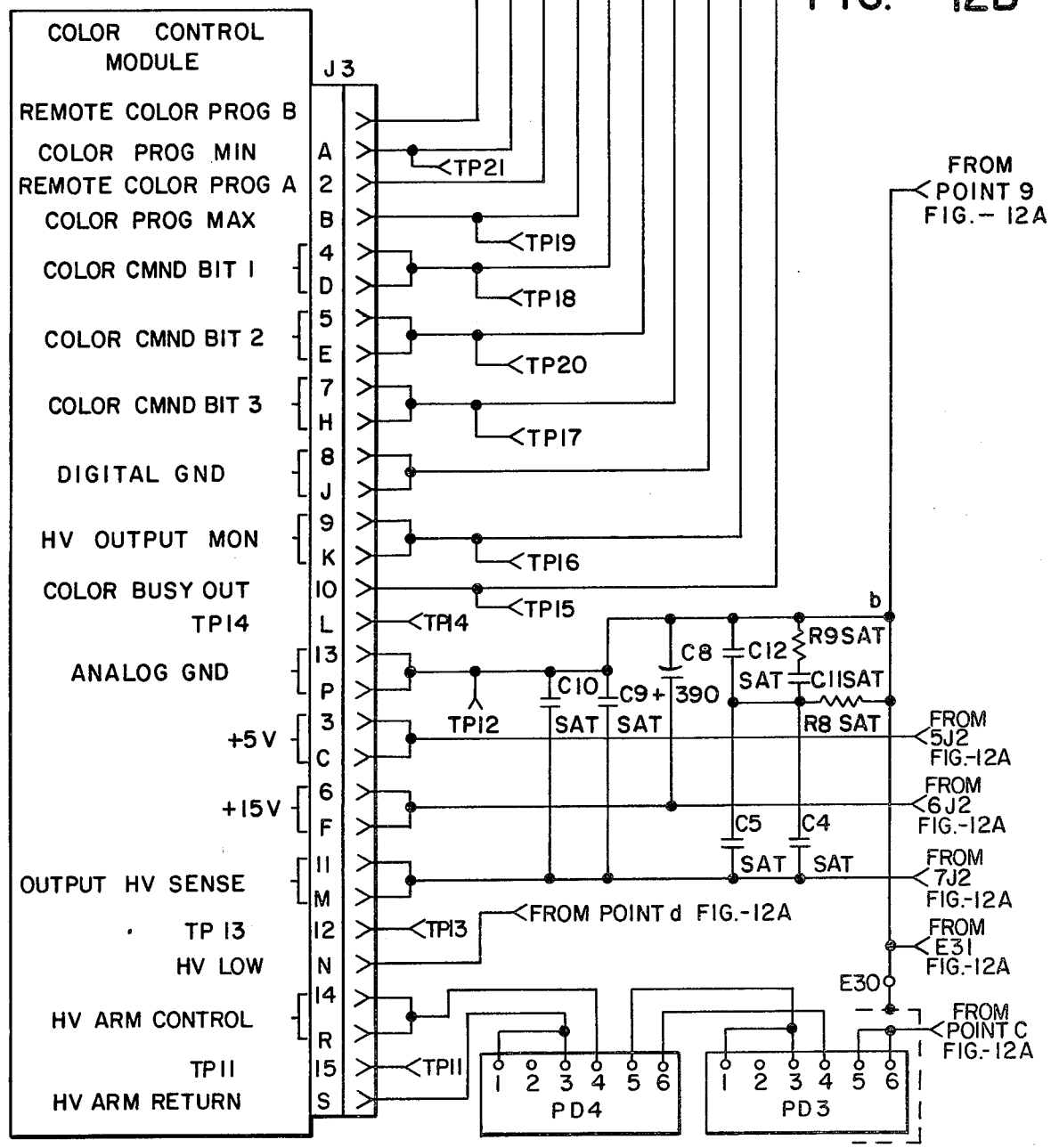
FIG.—12B

VOLTAGE POWER SUPPLY

BACKGROUND OF THE INVENTION

The present invention relates generally to voltage power supplies and more particularly to a voltage power supply which is especially suitable for providing a relatively high DC voltage output of rapidly changing amplitude adapted to drive the color changing circuitry of a CRT and specifically the anode of a beam penetration CRT or similar low current (less than one milliamp) load.

As just stated, the voltage power supply disclosed herein is especially suitable for driving the anode of a beam penetration CRT. A voltage power supply utilized in this way is required to apply a rapidly changing voltage output which corresponds to and is ultimately responsible for producing changing colors in the CRT. There is however a problem in rapidly changing the anode voltage of a CRT. Specifically, the anode capacitance (typically on the order of 400 pF to 1000 pF) must be charged to increase voltage and discharged to decrease it. This charging and discharging action of a capacitor is described by the well known charge law:

$$\Delta V = \Delta Q / C \quad (1)$$

$\Delta V$ is the voltage change and $\Delta Q$ is the amount of charge (in coulombs) to be added or removed.

In a "slewing" method of operation, that is, where the input voltage to the CRT anode is either pulled up or pulled down, charges are added or removed at an approximately constant rate so that equation 1 above may be rewritten as:

$$\Delta V = I \Delta T / C \quad (2)$$

I is an approximately constant current and $\Delta T$ is the time required to produce the voltage change $\Delta V$.

As an example of the foregoing, let it be assumed for the moment that $\Delta V$ equals 8000 V, C=1000 pF and $\Delta T$=200 microseconds. Based on these values, I=40 milliampere. Each time a change $\Delta V$ is produced, energy is added or removed from the capacitor according to:

$$E = \tfrac{1}{2} C \Delta V^2 \text{ (joules)} \quad (3)$$

If the change $\Delta V$ is repeated N times each second then the flow of energy into the capacitor is given by:

$$W_{IN} = (N C \Delta V^2 / 4) \text{ (watts)} \quad (4)$$

Similarly, the flow of energy out of the capacitor is:

$$W_{OUT} = N C \Delta V^2 / 4 \quad (5)$$

For example, if the change calculated above were to be repeated 500 times per second, $W_{IN}$ would equal 8 watts and $W_{OUT}$ would equal 8 watts. Thus, the circuit must be capable of sourcing and sinking a substantial current (in the 40 to 80 milliamp range) during the slewing interval and must also be capable of sourcing and sinking a substantial amount of power if a moderately high repetition rate is required.

As will be seen hereinafter, the voltage power supply of the present invention is one which is especially suitable for driving a CRT while at the same time meeting the various demands placed on it. As will also be seen, in the circuit approach of the present invention, specifically in its preferred embodiment, the power for the slewing function is 10 kv regulated with an output of up to 5 milliamp, i.e. a total power equal to 50 watts maximum. As will also be seen, the voltage power supply of the present invention includes a number of uncomplicated and yet advantageous circuit arrangement for providing an uncomplicated and yet reliable method of producing a relatively high DC voltage output of rapidly changing amplitude.

OBJECTS AND SUMMARY OF THE INVENTION

One object of the present invention is to provide a voltage power supply which is especially suitable for providing a relatively high DC voltage output of rapidly changing amplitude.

Another object of the present invention is to provide a relatively high DC voltage output which is especially suitable for driving a CRT in the manner described previously.

Still another object of the present invention is to provide specific circuit arrangements which comprise part of the overall voltage power supply for enhancing the overall operation of the power supply and which may be used in other circuitry to serve generally one function.

The voltage power supply which meets the various objectives recited and which includes various additional features to become apparent hereinafter is disclosed herein. This voltage power supply when constructed in accordance with the present invention includes an inverter circuit adapted for connection to a fixed, relatively low amplitude DC voltage input for producing an AC voltage output in response thereto. A converter circuit is connected with the inverter and is responsive to the AC voltage output for producing at its output a DC drive voltage having a fixed amplitude substantially higher than the DC voltage input. This drive voltage is applied to a voltage varying circuit, specifically a pullup and pulldown circuit arrangement in a preferred embodiment, which produces an adjustable DC output voltage having an amplitude not exceeding the amplitude of the drive voltage. A voltage adjusting circuit, specifically a color control circuit when the voltage power supply is used for driving a CRT, is connected to the voltage varying circuit and is adapted for connection to means for producing a coded signal, specifically a color command input, for rapidly changing the amplitude of the adjustable output voltage in response to the coded signal.

In accordance with one aspect of the present invention, the voltage power supply just recited, in its preferred embodiment, includes a DC voltage adding circuit for producing an auxiliary DC voltage of substantially fixed amplitude, specifically about 8 kV when the power supply is utilized for driving the CRT. This voltage adding circuit is connected with the voltage varying circuit, specifically the pullup and pulldown circuit arrangement, for adding the auxiliary voltage to the adjustable output voltage, whereby to provide an adjustable output voltage of even greater amplitude. Moreover, in this preferred embodiment, the power supply includes circuit means connected with the voltage varying circuit and with the voltage adding circuit for regulating the output of the latter in a feedback mode. Other aspects of the present invention will become apparent hereinafter. For purposes herein, the term "amplitude" shall be synonymous with "Magnitude" with regard to DC voltage.

BRIEF DESCRIPTION OF THE DRAWINGS

FIG. 1 is a block diagram of a voltage power supply constructed in accordance with the present invention.

FIG. 3 is a schematic diagram of another circuit arrangement comprising part of the power supply of FIG. 1, specifically a DC to AC to DC inverter/converter circuit.

FIGS. 4 to 7 illustrate specific voltage signals within the circuitry of the voltage power supply illustrated in FIG. 1.

FIG. 8 is a schematic diagram of still another circuit arrangement comprising part of the power supply illustrated in FIG. 1, specifically a pull-up/pull-down circuit arrangement.

FIG. 9 is a schematic diagram of a current control circuit comprising part of the pull-up/pull-down circuit arrangement illustrated in FIG. 8.

FIG. 10 is yet another circuit arrangement comprising part of the voltage power supply illustrated in FIG. 1, specifically an 8 kV floating multiplier and inverter-converter circuit.

FIG. 11A is schematic diagram of one part (of two parts) of still another circuit arrangement comprising part of the power supply illustrated in FIG. 1, specifically a color control circuit.

FIG. 11B is the other part of the schematic diagram illustrated in FIG. 11A.

FIG. 12A is a one part (of two parts) of a schematic wiring diagram illustrating the circuit inner connections between the various circuit arrangement illustrated in the various figures.

FIG. 12B is the other part of the diagram illustrated in FIG. 12A.

DETAILED DESCRIPTION AND PREFERRED EMBODIMENTS

Figure 2A:
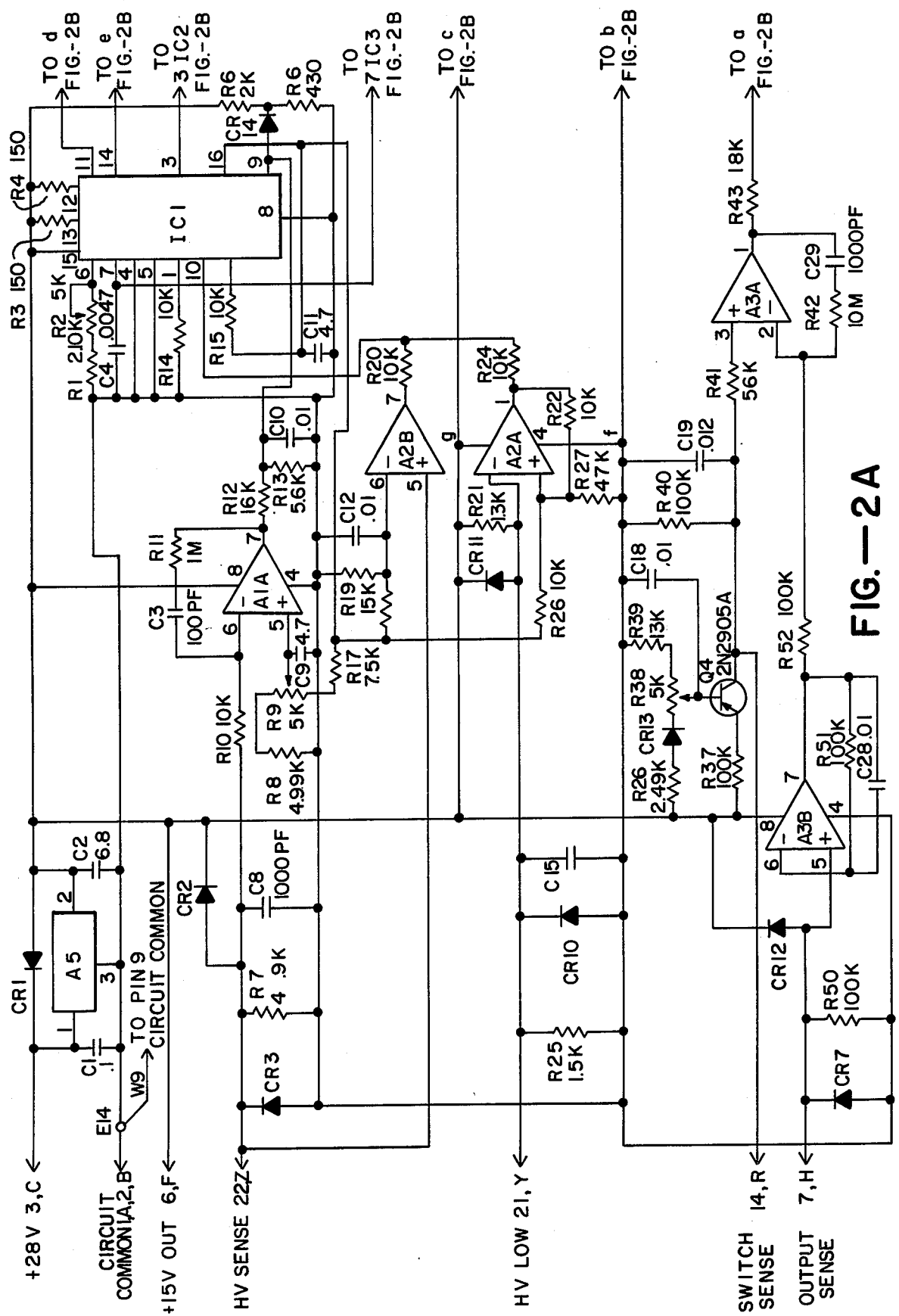
FIG. 2A is one part (of two parts) of a schematic diagram of a particular circuit arrangement comprising part of the power supply of FIG. 1, specifically an inverter driver circuit arrangement.

Turning now to the drawings, it is to be understood at the outset that, while some of the components will be designated by like reference numerals throughout the various figures, some will not. More specifically, some components may be designated by different reference numerals as they appear in different figures and different components may be designated by the same reference numeral in different figures. For example, a particular resistor may be referred to in one figure by one reference number and in another figure by another reference number. By the same token, a particular resistor in one figure may have the same reference numeral as a completely different resistor in a different figure. Accordingly, as the detailed description proceeds, reference will always be made to the particular figure under discussion so that it is clear which particular component is being discussed.

Turning now specifically to FIG. 1, the voltage power supply is illustrated and is generally designated by the reference numeral 10. As will be seen hereinafter, this power supply includes a number of circuit arrangements or modules as they are called in FIG. 1 for ultimately producing two output signals, specifically a relatively high DC voltage output of rapidly changing amplitude and a second voltage output. The first of these two outputs is applied to the terminal entitled "HV output" in FIG. 1 and is adapted to drive the anode of a CRT, as stated previously. The second output is applied to the terminal entitled "color busy output" and may be referred as a "busy" signal which is to be applied to the CRT control circuitry during the operation periods of the power supply when the amplitude of the high DC voltage output is changing, that is, during its slewing period. Each of the various modules including the way it functions as well as its circuitry will be discussed hereinafter. For the moment, it should suffice to say that these modules include a 10 kV regulator and driver which comprises part of module 1 along with a 8 kV regulator and driver which comprises the other part of module 1. The modules also include a 10 kV block which is module 2, modules 3 to 6 which together make up an overall pull-up/pull-down circuit arrangement 12 including a control circuit 14. The remaining modules illustrated in FIG. 1 include a color control circuit which is module 7 and a 8 kV floating block which is module 8.

Remaining in FIG. 1, attention is specifically directed to the 10 kV regulator and driver comprising part of module 1 and the 10 kV block comprising module 2. As seen in this figure, module 1 is adapted for connection to a fixed relatively low amplitude DC voltage input, specifically the 28 v DC input indicated, for providing regulated +15 volt and +5 volt outputs to the color control circuit comprising module 8, as will be seen hereinafter. Moreover, the 10 kV regulator and driver and the 10 kV block combine to provide an inverter circuit for inverting the 28 volt DC input voltage to an AC voltage output and a converter circuit connected with the inverter circuit and responsive to the AC voltage output for producing at its output (indicated at T1 in FIG. 1) a DC drive voltage having a fixed amplitude substantially higher than the DC voltage input. As indicated, this drive voltage is a 10 kV DC signal which, as will be seen hereinafter, is provided for driving pull-up/pull-down circuit arrangement 12.

As illustrated in FIG. 1, the 10 kV drive signal applied to arrangement 12 at terminal T1 is also monitored by means of a feedback arrangement including the resistors R1 and R2. More specifically, as will be seen hereinafter, the resistor R1 which is part of module 2 provide 2.5 volts across sensor resistor R2 when module 2 is operating at 10 kV, that is, when terminal T1 is at 10 kV. The purpose of the feedback circuit is of course to maintain the drive voltage at its present fixed amplitude and accomplishes this by means of comparison between the voltage sensed and a reference voltage for controlling the 10 kV regulator and driver which in turn ultimately controls the amplitude of the drive voltage at terminal T1.

One important aspect of the circuitry which comprises part of the 10 kV regulator and driver in the 10 kV block and which will be discussed in more detail hereinafter, resides in the particular way in which the previously recited AC voltage is produced. As will be seen in FIG. 3, the inverter circuit includes a transformer, specifically a center tap transformer 16 (see FIG. 3) having a primary side and a secondary side. The primary side not only includes the centertap connected to the 28 V DC input but also two end taps adapted for connection to ground. The secondary side is of course connected to the converter circuit designated at 23 in FIG. 3. In addition, as will be seen in FIG. 2, the inverter circuit includes means for alternately connecting one end tap to and disconnecting it from ground at a rate equal to the natural resonant frequency of the transformer while, at the same time, disconnecting the other end tap from and connecting it to ground. In this way, the AC voltage previously discussed is produced across the transformer secondary side. The important point to note here is that each of the end taps of the transformer primary is connected to and disconnected from ground at the natural resonant frequency of the transformer, which has advantages to be discussed hereinafter.

As stated previously, the 10 kV drive signal at terminal T1 is provided for driving pull-up/pull-down arrangement 12. As illustrated in FIG. 1, this arrangement includes modules 3 to 6 and it also includes current control circuit 14 having output terminal T2. As will be seen in more detail hereinafter, arrangement 12 is provided for producing at its output, specifically terminal T2, an adjustable DC output voltage having an amplitude not exceeding the amplitude of the drive voltage, specifically having an amplitude between 0 and 10 kV. In actual practice, however, because of practical limitations, the amplitude of the adjustable DC output voltage will vary between 1 kV and 9 kV. While this circuit arrangement functions in most respects like a conventional pull-up/pull-down circuit, it does include certain novel aspects in and by itself, as will become more apparent hereinafter. For the moment, it should suffice to say this circuit arrangement like conventional circuit arrangements of the same general type draws a quiescent current during the period when the amplitude of its output signal at terminal T2 remains at a constant level and it draws a substantially larger current during the period when the amplitude of its output at terminal T1 changes, e.g. during the slewing period. However, this circuit in its preferred embodiment, as will be seen hereinafter, includes circuit means for maintaining the quiescent current substantially constant regardless of the adjusted amplitude of the voltage at T2 and circuit means for limiting the larger current during the slewing period to a maximum level.

As also illustrated in FIG. 1, the output of circuit arrangement 12, specifically terminal T2, is applied to the input of the 8 kV floating block making up module 8. This latter module includes circuitry for producing an auxiliary DC voltage of substantially a fixed amplitude, specifically 8 kV, as indicated. This auxiliary DC voltage is added to the adjustable DC output voltage at terminal T2 for providing an adjustable output voltage of even greater amplitude, specifically 8 kV greater, at output terminal T3. In a preferred embodiment, as will be discussed in more detail hereinafter, the 8 kV floating voltage is also produced by utilizing a transformer in substantially the same way discussed previously with respect to module 1 and 2. More specifically, as will be seen, the 8 kV floating voltage is produced by first applying the 28 volt DC input to one tap of the primary side 22 of a transformer 18 (FIG. 10) while a second tap of the transformer primary is connected to and disconnected from ground at the resonant frequency of the transformer which, unlike the previous transformer, preferably not of the center tap type. The secondary side of the transformer which developes an AC signal is converter to the 8 kV DC voltage by converter circuit 27 (FIG. 10).

Remaining in FIG. 1, the color control circuit which, as stated, is module 7 is interconnected to the pull-up/pull-down arrangement, specifically to module 6 and is also adapted for connection to a coded signal, specifically to a color command input as indicated in FIG. 1. This coded signal is provided for rapidly changing the amplitude of the adjustable output voltage, specifically the voltage at terminal T2. This coded signal may be conventional, for example it may comprise a train of logic bits from a computer which is provided for programming the output of the voltage supply for providing a specific program of colors across the screen of the CRT when the power supply is used therewith. Because this coded signal may be conventional a further discussion of the manner in which it is produced will not be provided herein. It suffices to say, that these coded signals are used to control the color control circuit which, in turn, is provided for controlling arrangement 12 in a manner to be discussed in more detail hereinafter. It is however important to note that the color control circuit not only controls arrangement 12 but also provides the busy signal indicated at "color busy output", as stated previously. In actual practice, this signal which is applied during the slewing period of the voltage supply operation, that is, during the period when the adjustable voltage output at terminal T2 (or terminal T3) is changing in amplitude from one level to another, is utilized to indicate this period to the appropriate control circuitry within the CRT so that it can operate accordingly. While the way in which this busy signal is produced will be discussed hereinafter, it is worth pointing out now that this signal normally results from a actual changing amplitude of the adjustable voltage at terminal T2. However, if the change in voltage is small, the circuitry provided for terminating the busy signal may not respond to the termination of this small change and hence may not terminate the busy signal. As a result, as will be seen hereinafter, the color control circuit includes means for automatically timing out the busy signal predetermined period of time after its initiation caused by the coded input signal.

As stated previously, the 8 kV regulator and driver illustrated in FIG. 1 comprises part of module 1. This part module along with resistors R3, R4, R5 and R6 provide an overall feedback network which, as will be seen, includes (1) means for producing a DC voltage signal having an amplitude proportionate to the voltage at terminal T3, (2) means for producing a DC reference voltage signal having an amplitude equally proportionate to the 8 kV auxiliary voltage, (3) means for producing a DC voltage signal having an amplitude equally proportionate to the input voltage at T2 and (4) means responsive to the difference between the first mentioned proportionate voltage signal and the sum of the last mentioned proportionate voltage signals for adjusting the voltage at T3 until the difference is zero, thereby regulating this last mentioned voltage. In actual practice, the resistor R3 illustrated in FIG. 1, which is part of module 8, produces a "high voltage feedback" across sense resistor R4 of 1:2000 of the high voltage output at T3. The feedback resistor R5, which is part of the interconnect board (FIG. 12) produces a switch output feedback across sense resistor R6 of 1:2000 of the switch output voltage, that is, the output voltage at terminal T2. The difference between the high voltage feedback and the switch output feedback is a measure of the voltage output of the floating block and is used in module 1 to regulate this voltage by supplying an appropriate drive to the invertor transformer which is part of the following block. One point which is worthy to know is that in the preferred embodiment of this circuitry, a constant current generator and an associated resistor are utilized for producing the DC reference voltage signal just recited, as will be seen hereinafter. This is important since the color control circuit operates on +15 volts and it does not have negative voltage available to its circuitry.

Having provided a general description of the various modules illustrated in FIG. 1 as well as the way in which they innerconnect to one another along with certain functional features, attention is now directed to the detailed circuitry making up these modules, of course, only where such details are necessary. In this regard, it will be apparent that certain circuitry will not need an explanation while other circuitry will be discussed in detail.

Figure 2B:
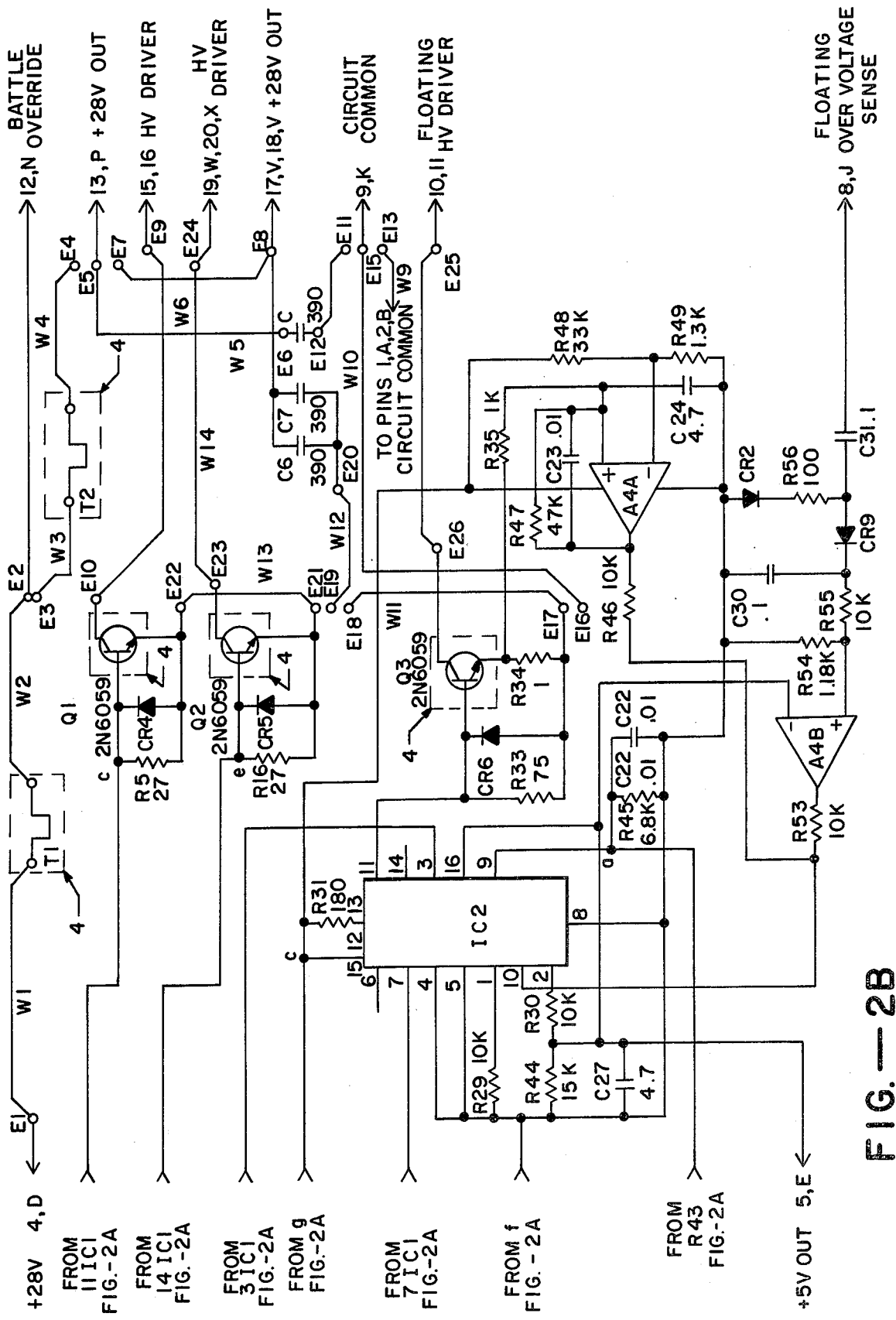
FIG. 2B is another part of the schematic diagram illustrated in FIG. 2A.

Attention is now directed to Module 2. As shown in FIG. 2, the 28 V input applied to the input of this module is also applied directly (via thermal switches T1 and T2) to the inverter transformers of the 10 kV block (via pins 17, 18, U, V) and of the 8 kV floating block (via pins 13 and P), which transformers are illustrated in FIGS. 3 and 10 respectively and generally designated by the reference numerals 16 and 18.

15 volt regulator A5 in FIG. 2 provides stable, isolated power for the high voltage regulator circuits and is also supplied to power the color control module 7 via pins 6 and F.

A highly stable 5 volt source is generated by IC1 and IC2 pin 16 and is used as a reference in module 2 as well as being supplied to power the logic circuits in the color control module via pins 5 and E.

The inverter drives and their control are obtained by means of a novel circuit discussed generally above. The circuit applies a pulse width modulated drive to the inverter transformer 16 at its resonance frequency. By this means power conversion efficiencies of 70% to 80% are obtained with substantially sinusoidal transformer voltage waveforms.

An SG1524 integrated pulse width modulator circuit, ICI in FIG. 2, is used to turn on inverter drivers Q1 and Q2 for an appropriate length of time at a frequency determined by R1 and R2 with C4 which is approximately 25 kHz.

The base drive pulses at pins 11 and 14 of ICI are phased so that they occur alternately and are prevented from overlapping by diode CR14 and biasing resistors R6 and R23 which limit the maximum pulse width to approximately 40% of the total period.

Inverter drivers Q1 and Q2 are thus alternately turned on (saturated) so that they are alternately connect to ground, first one side and then the other side of the center tapped primary 20 of the inverter transformer 16 as seen in FIG. 3. The secondary 21 of the transformer is connected to AC to DC converter 23.

During the time when either Q1 or Q2 is on, the 28 V input appears between the transformer center tap and either side of the primary. A current starting at 0 and increasing to a value Imax will flow in the transformer winding since the transforemr primary appears as a mainly inductive load Lp.

The primary current will then be approximately in accordance with the well known inductance relation.

$$E = -L(\Delta I / \Delta T) \tag{6}$$

For example, if the inverter driver "on" time is "T" then the maximum current is:

$$I_{max} = V \times T/Lp = 28T/Lp \tag{7}$$

The energy applied to the transformer is:

$$E = \tfrac{1}{2} L \, T^2 \tag{8}$$

Which, applied to equation (7) gives:

$$E = \frac{L}{2} \left( \frac{28T}{Lp} \right)^2 \tag{9}$$
$$= \frac{784T^2}{2Lp}$$

Since this amount of energy is applied 2F times per second (where F is the inverter frequency) the power input:

$$W_{IN} = 784 F T^2 / Lp \tag{10}$$

And since both F and Lp are constants the power input is proportional to the square of the "on time" of the inverter drivers.

When the inverter drivers are off, the transformer waveforms resume their sinusoidal waveform since the applied drive has been adjusted to be at the same frequency as the transformer natural resonant frequency. The Q1 collector waveforms are illustrated in FIG. 4 (lightly loaded) and FIG. 5 (heavily loaded).

The 10 kV divider resistor (R1 in FIG. 1) provides 2.5 V across sense resistor R7 (which corresponds to R2 in FIG. 1) when the high voltage is 10 kV. This sense voltage is applied to the inverting input of A1A in FIG. 2 and compared with a 2.5 V reference at the slider of R9.

The output of A1A is applied to Pin 9 of ICI. At this pin +1 V corresponds to zero pulse width and +3.5 V maximum pulse width.

The feedback is in the direction of increasing pulse width if the sensed voltage is lower than the reference and thus tends to maintain a very stable high voltage soutput by suitably adjusting the pulse width.

A2B is connected as a comparator so that its output will go high (+13 V) if the high voltage sense exceeds the +3 V applied to the inverting input by R18 and R19 from the 5 V reference. The A2B output is applied to pin 10 of IC1 and will cause it to go to its minimum pulse width condition. A2B thus operates as a "voltage protect" circuit to prevent the output from exceeding 12 kV.

The "HV low" return current of the 10 kV block (module 8) flows back to ground through R25 and R21 in parallel (695 ohms). Since the return current direction is from ground to "HV low" and R21 is connected to +15 volts the HV low potential varies from 8 V when the return current is zero (no HV output) to 4.1 V at 5.6 MA (max. HV out). The above potential is applied to the inverting input of A2A and a reference 4.1 V is applied to the non inverting input via R27 and R27 from the +5 V reference (pin 16 of IC1). If the HV low potential goes below 4.1 V (greater than 5.6 MA) the output of A2A goes high thus shutting off ICI and stays high until the HV low potential goes above 4.8 V (less than 3.3 MA) because of the effect of hysterisis resistor R22. A2A thus effectively prevents the output current of the 10 kV block from exceeding 5.6 MA under all circumstances including a short circuit across the output.

Floating 8 kV block inverter driver Q3 operates in a similar manner to Q1 and Q2 except that its collector is connected to one side of the primary winding 22 of transfer 18 as illustrated in FIG. 10 and the other side of the primary is connected to +28 V. The secondary 25 of this transformer is connected to AC to DC converter 27.

The power input to this inverter transformer is given by:

$$W_{IN} = 392FT^2/L_p \tag{11}$$

Since energy is applied only once per cycle instead of twice as in equation (10) above. However, in this case, also the power input is proportional to the square of the inverter driver "on time".

The "HV output" divider resistor (R3 in the block diagram of FIG. 1) produces a high voltage feedback across R50 of FIG. 2 (which responds to R4 in the block diagram of FIG. 1) of 1:2000 of the high voltage output. This feedback voltage is buffered by A3B and then applied to the inverting input of differential amplifier A3A.

The "switch output" feedback resistor (R5 in the block diagram of FIG. 1) produces a "switch output" feedback across sense resistor R40 of FIG. 2 (which corresponds to R6 in the block diagram) of 1:2000 of the switch output voltage.

Current source Q4 sources a highly stable current into R40 thus summing a DC component with the switch output feedback voltage. This sum is applied to the non inverting input of A3A. The DC component operates as the programming for the floating HV block voltage since the switched voltage changes are applied in common mode to A3A (and therefore cancel) and only the DC terms operate as feedback. For a floating block output voltage of 8 kV the current source Q4 must source 40 μA into R40. (i.e. a DC programming voltage of 4 V).

The output of differential amplifier A3A is applied to pin 9 of IC2 and controls the drive pulse width to maintain the programmed floating block voltage. No pulse width limiting diode is required since the single inverter driver operates satisfactorily up to the maximum 50% pulse width. Q3 collector waveforms are shown in FIG. 6 (light load) and FIG. 7 (heavy load).

A4B operates as the voltage protect comparator with the 5 V reference from pin 16 of IC2 applied to its non inverting input.

The voltage across a separate sense winding in the floating block inverter transformer is rectified by voltage doubler CR 8 and CR 9 in FIG. 2 and approximately 1:10 of this DC output is applied to the non inverting input of A4B. If the floating block voltage exceeds 10 kV this sensed voltage exceeds 5 V and A4B output goes high, shutting off IC2.

A4A operates as the current limit comparator with a threshold setting of 0.57 V at its inverting input and the average value of Q3 current applied to the non inverting input. If the average Q3 current exceeds 570 MA, A4A will go high and shut down IC2 until the current is reduced to a lower value.

Attention is now directed to the pull-up/pull/down circuit arrangement 12 illustrated in FIGS. 8 and 9. In FIG. 8 each 5 kV module (Modules 1–6 in FIG. 1) consists of twelve high voltage darlington circuits 26 biased by a chain of 12 resistors R13A through R16C. Only one module, for example Module 3, is illustrated in FIG. 8.

430 volt varistors are connected across each stage so that the maximum voltage across each stage is limited to a predetermined level, approximately 430 V in the preferred embodiment.

Separate connections are provided for the resistor and transistor chains as well as separate connections for R16C and the base of Q23, to allow for the drive and current control circuit arrangements, specifically the outputs of 10 kV block module 2 and circuit 14.

The partial schematic illustrated in FIG. 9 shows how these modules are interconnected to implement the slewing and regulating functions of the voltage supply. The 10 kV voltage at terminal T1 in FIG. 1 is applied to the top of circuit 12, control is accomplished by adjustment of the current at the bottom of module 6, the switch output is produced at the center of the arrangement via current control circuit 14 on the interconnect board.

When the switch output (that is adjustable voltage at T2) is at some quiescent (static) level between 1 kV and 9 kV the circuit operates in a linear mode with pull-up modules 3 and 4 acting as a current source of approximately 2 milliampere and pull-down modules 5 and 6 acting as shunt regulators.

In this operating mode modules 5 and 6 sink the difference between the current sourced by modules 3 and 4 and the current used by the output load. Control for this function is provided by a high gain DC feedback loop implemented by the color control circuit (Module 7) and this results in the output voltage being stabilized to better than 0.05%.

Current sourced by modules 3 and 4 can flow to the switch output via R7 and CR5 in FIG. 9 (depending on load current requirements) and can flow to modules 5 and 6 via R4 and via R5 and CR3.

As illustrated in FIG. 9, most of the current flows through R4 and is regulated to approximately 2 milliamps by Q23 and Q24 in conjunction with CR3, that is, the quiescent current is maintained substantially constant. The current contribution from R16C in series with R6 varies from approximately 10 μA to over 1 milliamp depending on output voltage while the contribution from Q23 and Q24 adjusts itself to maintain a constant 8.8 V across R4 (i.e. 2 milliamps). The current contribution from R5 and CR3 also varies with output voltage from approximately 50 μA to over 500 μA and this current is not regulated.

Modules 5 and 6 must therefore sink from approximately 2 MA to 2.5 MA depending on output voltage. If the resistor divider current were connected directly to the top of module 5 as is normally done modules 5 and 6 would have to sink between approximately 2 MA and 3.5 MA and the maximum quiescent dissipation would be increased by more than 10 watts.

If a downward slew is commanded, that is, the amplitude of the voltage at T2 (or T3) is to be reduced, the color control circuit applies the maximum drive to Q1 since the output cannot follow the new programmed input and the feedback amplifier IC2 therefore goes to its maximum positive output.

Modules 5 and 6 are then driven to their maximum current wich is limited to 80 MA by R9 which causes Q1 to become saturated when the voltage across R9 exceeds 8.8 V.

Modules 5 and 6 will then sink all the current from modules 3 and 4 as well as the current to discharge the load capacitance (via CR6).

When the output capacitance is discharged such that the output voltage equals the programmed output the drive to Q1 is reduced to a lower level and the quiescent regulation condition is reestablished.

If an upward slew is commanded the color control circuit causes Q1 to be cut off, so that the transistor chain in modules 5 and 6 is cut off.

Part of the R4 current is thus no longer sinked by modules 5 and 6 which causes the voltage across R4 to become less than 8.8 V causing CR 3 to cut off and all the drive from R5 to be applied to Q23.

Modules 3 and 4 are thus turned on to a maximum current which will flow via R7 and CR5 to charge the load capacitance.

Q1 (on the interconnect board) together with CR4 and R7 acts as a current limit circuit by sinking some of the R5 current to prevent excessive current in modules 3 and 4.

When the load capacitance is charged such that the output voltage equals the programmed output the drive to Q1 is restored and the quiescent regulation condition is reestablished.

Attention is now directed to the color control circuit of Module 7 which is illustrated in FIG. 11. The three digital command lines for providing a coded signal are applied to the inputs of latch IC9. As long as the enable inputs 4 and 13 of IC9 are high the input states appear at the Q1, Q2 and Q3 outputs and their complements at the $\overline{Q1}$, $\overline{Q2}$ and $\overline{Q3}$ outputs.

The Q1, Q2 and Q3 outputs are applied via level shifting buffers IC6 to the A0, A1 and A2 inputs of analog multiplexer IC10.

IC10 is a self decoding MOS multiplexer and its pin 3 output is connected to one of its Y0 through Y7 inputs as determined by the state of its A0, A1 and A2 inputs.

IC8B is connected as a "bootstrap" constant current source for CR3 and its output voltage may be adjusted by R31 (8.5 V to 10 V).

IC8A is a constant current generator which sources a current from pin 3 of Vref milliamps. Where Vref is the reference applied from the output of IC8B. (i.e. from 8.5 to 10 MA.)

The current from pin 3 of IC8A flows through R18, R19, R20, R21 and R22 in parallel (400 ohm) producing a voltage drop of 3.4 V to 4.0 V.

The bottom of R18 through R22 in parallel is set at a very stable reference voltage at the output of IC3 which can be adjusted by trimpot R34 from 3.75 V to 5.3 V.

The sliders of R18 through R22 can therefore be set to a specific programming voltage whose minimum value is determined by the R34 adjustment and whereby the range of input programming can be pre-set by the R31.

The pin 3 output of IC10 will be connected to the slider of any of trimpots R18 through R22 or the top or bottom end of the trimpots depending on the input code thus allowing the selection of seven program levels, two fixed and five variable.

The output of IC10 is buffered by follower IC3 and applied to the non inverting input of IC2 where it is summed with the output high voltage sense which is buffered by follower IC1A.

The difference between these inputs is amplified by IC2 whose output controls the current in the pull-up/pull-down modules via Q1 as explained previously.

IC1B provides buffered monitoring of the output HV sense.

The output of IC2 has an average value of 6.2 V determined by 5.6 V zener CR 2 and the Vbe of Q1) during the linear operating mode, approximately +13 V during a down slew and approximately +2 V during an up slew. Dual comparator IC4 has a non inverting threshold of 7.1 V and an inverting threshold of 5 V so that pin 1 will be high during a down slew and pin 14 will be high during an up slew.

These slewing indicator signals are combined with a narrow 5 μsec pulse generated by IC11 whenever a change of input code appears at the output of the input latch IC9 in two nor gates IC5 whose outputs are further combined in nor gate IC6.

Pin 10 of IC6 will therefore go low at the start of a level change and will stay low until the slewing mode is nearly completed. If the output level change is very small (say a few hundred volts) the drive outputs of IC2 may not exceed the thresholds of comparator IC4 and in this case the output of IC6 will go low only for the duration of the output pulse of IC11.

The positive going edge at the end of the output of IC6 triggers one shot IC7 so that its "$\overline{Q}$" output will go low for approximately 60 μsec.

The R-S flip-flop IC5 is set by the output pulse from IC11 and reset via differentiator C17 and R43 by the positive going edge at the end of the $\overline{Q}$ output pulse of IC7.

The output of buffer Q2 thus goes high at the start of a change of level and goes low again 60 μsec after the end of the slew period.

This signal is the "color busy" output which signals that a transition and the settling which follows it is in progress and should be used to blank the CRT and to signal the computer tha a steady output voltage has not yet been achieved.

The "HV low" output of the 10 kV block is applied to the non inverting input of comparator IC4 which is set to a threshold of 4.4 V so that the output of IC4 will go low and disable the input latch IC9 when the "HV low" level goes below 4.4 V (approximately 5 MA). The input latch is thus intermittently disabled if the current exceeds 5 MA due to too many slews per second being commanded.

This system is thus largely adaptive since it permits any desired mix of slew amplitude and capacity loading up to the power limited maximum. In addition since it adaptively signals level changes in process it permits a maximum "display on" time.

FIG. 12 illustrates how the various modules are interconnected together. In this regard, it is to be understood that some circuitry has been illustrated in the various figures including FIG. 12 but not discussed. An understanding of this circuitry will be obvious to those skilled in the art from the previous discussions.

A voltage power supply constructed in accordance with an actual working embodiment has been constructed and includes the specific circuitry illustrated as well as the values set forth therein. However, it is to be understood that the voltage supply of the present invention is not limited to that specific circuitry or those specific values.

What is claimed is:

1. A voltage power supply especially suitable for providing a relatively high DC voltage output of rapidly changing amplitude, said power supply comprising:

(a) inverter means adapted for connection to a fixed relatively low amplitude DC voltage input for producing an AC voltage output in response thereto;

(b) converter means connected with said inverter means and responsive to said AC voltage output for producing at its output a DC drive voltage having a fixed amplitude substantially higher than said DC voltage input;

(c) voltage varying means including a pull-up and pull-down circuit arrangement connected to the output of said converter means for producing at its output an adjustable DC output voltage having an amplitude not exceeding the amplitude of said drive voltage; and (d) voltage adjusting means connected to said voltage varying means and adapted for connection to means for producing a coded signal for rapidly changing the amplitude of said adjustable output voltage in response to said coded signal.

2. A voltage power supply according to claim 1 including voltage adding means for producing an auxilliary DC voltage of substantially fixed amplitude, said voltage adding means being connected with said voltage varying means for adding said auxiliary voltage to said adjustable output voltage, whereby to provide an adjustable output voltage of greater amplitude.

3. A voltage power supply according to claim 2 including means connected with said voltage varying means and said voltage adding means for regulating said greater adjustable output voltage, said regulating means including:

(a) means for producing a DC voltage signal having an amplitude proportionate to said greater adjustable output voltage;

(b) means for producing a DC reference voltage signal having an amplitude equally proportionate to said auxiliary voltage;

(c) means for producing a DC voltage signal having an amplitude proportionate to said adjustable output voltage; and (d) means responsive to the difference between said first-mentioned proportionate signal and the sum of said last-mentioned proportionate signals, if any, adjusting said greater adjustable output voltage until said difference is zero whereby to regulate said last-mentioned voltage.

4. A voltage power supply according to claim 3 wherein said reference voltage producing means includes a constant current generating source and a resistor at its output for producing said reference voltage.

5. A voltage supply according to claim 2 wherein said voltage adding means includes inverting and connecting means adapted for connection to said low amplitude DC voltage input for inverting said input to an AC voltage and for converting said AC voltage to said auxiliary voltage, said inverting means including:

(a) a transformer having its primary side including one tap-in terminal adapted for connection to said low amplitude DC voltage input and a second tap-in terminal adapted for connection to ground and its secondary side connected to said last-mentioned connecting means, said transformer operating at a predetermined resonant frequency; and (b) means for alternately connecting said second tap-in terminal to and disconnecting it from ground at a rate equal to said last-mentioned AC voltage output across said transformer secondary side.

6. A voltage power supply according to claim 1 including feedback means connected to said voltage varying means and said voltage adjusting means and responsive to said adjustable output voltage at any given time during operation of said power supply for maintaining said adjustable output voltage at its adjusted value.

7. A voltage power supply according to claim 1 wherein said voltage adjusting means includes means for producing a busy signal in response to and substantially only throughout the period during which the amplitude of said adjustable voltage changes from one level to another in response to said coded signal.

8. A voltage power supply according to claim 7 wherein said busy signal producing means includes means for terminating said busy signal a predetermined period of time after its initiation in the event said busy signal does not terminate at the end of said period.

9. A voltage power supply according to claim 7 wherein said busy signal producing means includes means for terminating said busy signal a predetermined period of time after its initiation in the event said busy signal does not terminate at the end of said period.

10. A voltage power supply according to claim 1 wherein said circuit arrangement draws a quiescent current during the period when the amplitude of said adjustable output voltage remains at a constant level, said arrangement including means for maintaining said quiescent current substantially constant regardless of the adjusted amplitude of said adjustable output voltage.

11. A voltage power supply according to claim 10 wherein said circuit arrangement draws a larger current during the period when the amplitude of said adjustable output voltage changes, said arrangement including means for limiting said current to a maximum level.

12. A voltage supply according to claim 10 including means for limiting the DC voltage across said circuit arrangement to a maximum predetermined amplitude.

13. A voltage power supply according to claim 1 including feedback means connected to said converter means and said inverter means and responsive to said DC drive voltage at any given time during operation of said power supply for maintaining said DC drive voltage at its fixed amplitude.

14. A voltage power supply according to claim 13 wherein said feed back means includes a comparator having two inputs, one of which is connected with said converter means and responsive to current from said drive voltage and the other of which is connected to means for producing a reference voltage comprising part of said feedback means, said feedback means including means for preventing the voltage at said first input from going negative even in response to a short at the output of said converting means.

15. A voltage power supply according to claim 14 wherein said inverting means includes means connected with said amplifier for disabling said inverting means and preventing it from producing a signal at its output if the input to the comparator decreases below a predetermined level.

16. A voltage power supply according to claim 1 wherein said inverter means includes (a) a transformer having its primary side including one tap-in terminal adapted for connection to said low amplitude DC voltage input and a second tap-in terminal adapted for connection to ground and its secondary side connected to said converter means, said transformer operating at a predetermined resonant frequency; and (b) means for alternately connecting said second tap-in terminal to and disconnecting it from ground at a rate equal to said resonant frequency whereby to produce said AC voltage output across said transformer secondary side.

17. A voltage power supply according to claim 16 wherein said transformer is a center tap transformer and wherein said primary side includes a third tap-in terminal positioned such that said one tap-in terminal is located between said second and third terminals so as to define a center tap, said third terminal being adapted for connection to ground, said connecting means connecting said third terminal to and disconnecting it from ground as it respectively disconnects and connects said second terminal to and from said ground whereby to produce said AC voltage output.

18. A voltage power supply according to claim 16 wherein said tap-in connecting and disconnecting means includes means response to said DC drive voltage for determining the time during which said second tap-in terminal is connected to ground between disconnections therewith, whereby to maintain said drive voltage at said fixed amplitude.

19. A voltage power supply according to claim 1 wherein said adjusting means includes means for maintaining said adjusted output voltage at its adjusted level at any given time during operation of said supply if at said given time the current at the output of said voltage varying means is above a predetermined level.

20. A voltage power supply especially suitable for providing a relatively high DC voltage output of rapidly changing amplitude, said power supply comprising:
(a) an inverter circuit adapted for connection to a fixed, relatively low amplitude DC voltage input for producing an AC voltage output in response thereto;
(b) a converter circuit connected with said inverter circuit and responsive to said AC voltage output for producing at its output a DC drive voltage having a fixed amplitude substantially higher than said DC voltage input;
(c) a feedback circuit connected to the output of said converter circuit and to an input in said inverter circuit and responsive to said DC drive voltage at any given time during operation of said power supply for maintaining said DC output voltage at said fixed amplitude;
(d) a pull-up and pull-down circuit arrangement connected to the output of said converter circuit for producing at its output an adjustable DC output voltage having an amplitude not exceeding the amplitude of said drive voltage;
(e) a voltage adding circuit for producing an auxiliary DC voltage of substantially fixed amplitude, said voltage adding circuit being connected with said pull-up and pull-down circuit arrangement for adding said auxiliary voltage to said adjustable output voltage, whereby to provide an adjustable output voltage of greater amplitude;
(f) a voltage adjusting circuit connected to said pull-up and pull-down circuit arrangement and adapted for connection to means for producing a coded signal for rapidly changing the amplitude of said greater adjustable output voltage, in response to said coded signal; and (g) circuit means connected with said pull-up and pull-down circuit arrangement and said voltage adding circuit for regulating said greater adjustable output voltage.

21. A voltage power supply according to claim 20 wherein said regulating circuit means include:
(a) means for producing a DC voltage signal having an amplitude proportionate to said greater adjustable output voltage;
(b) means for producing a DC reference voltage signal having an amplitude equally proportionate to said auxiliary voltage;
(c) means for producing a DC voltage signal having an amplitude proportionate to said adjustable output voltage; and
(d) means responsive to the difference between said first-mentioned proportionate signal and the sum of said last-mentioned proportionate signals, if any, for adjusting said greater adjustable output voltage until said difference is zero, whereby to regulate said last-mentioned voltage.

22. A voltage power supply especially suitable for providing a relatively high DC voltage output of rapidly changing amplitude, said power supply comprising:
(a) inverter means adapted for connection to a fixed relatively low amplitude DC voltage input for producing an AC voltage output in response thereto;
(b) converter means connected with said inverter means and responsive to said AC voltage output for producing at its output a DC drive voltage having a fixed amplitude substantially higher than said DC voltage input;
(c) voltage varying means connected to the output of said converter means for producing at its output an adjustable DC output voltage having an amplitude not exceeding the amplitude of said drive voltage; and
(d) voltage adjusting means connected to said voltage varying means and adapted for connection to means for producing a coded signal for rapidly changing the amplitude of said adjustable output voltage in response to said coded signal., said adjusting means including means for producing a busy signal in response to and substantially only throughout the period during which the amplitude of said adjustable voltage changes from one level to another in response to said coded signal.

23. A voltage power supply especially suitable for providing a relatively high DC voltage output of rapidly changing amplitude, said power supply comprising:
(a) inverter means adapted for connection to a fixed relatively low amplitude DC voltage input for producing an AC voltage output in response thereto, said inverted means including,
(i) a transformer having its primary side including one tap-in terminal adapted for connection to said low amplitude DC voltage input and a second tap-in terminal adapted for connection to ground and its secondary side connected to said converter means, said transformer operating at a predetermined resonant frequency, and
(ii) pulse width modulating means for alternately connecting said second tap-in terminal to and disconnecting it from ground at a rate equal to said resonant frequency whereby to produce said AC voltage output across said transformer secondary side;

(b) converter means connected with said inverter means and responsive to said AC voltage output for producing at its output a DC drive voltage having a fixed amplitude substantially higher than said DC voltage input;

(c) feedback means connected to said converter means and said inverter means and responsive to said DC drive voltage at any given time during operation of said power supply for maintaining said DC drive voltage at its fixed amplitude;

(d) voltage varying means connected to the output of said converter means for producing at its output an adjustable DC output voltage having an amplitude not exceeding the amplitude of said drive voltage; and (e) voltage adjusting means connected to said voltage varying means and adapted for connection to means for producing a coded signal for rapidly changing the amplitude of said adjustable output voltage in response to said coded signal.

24. A voltage power supply according to claim 23 wherein said transformer is a center tap transformer and wherein said primary side includes a third tap-in terminal positioned such that said one tap-in terminal is located between said second and third terminals so as to define a center tap, said third terminal being adapted for connection to ground, said connecting means connecting said third terminal to and disconnecting it from ground as it respectively disconnects and connects said second terminal to and from said ground whereby to produce said AC voltage output.

25. A voltage power supply according to claim 23 wherein said tap-in connecting and disconnecting means includes means response to said DC drive voltage for determining the time during which said second tap-in terminal is connected to ground between disconnections therewith, whereby to maintain said drive voltage at said fixed amplitude.

26. A voltage power supply according to claim 25 wherein said feedback means includes a comparator having two inputs, one of which is connected with said converter means and responsive to current from said drive voltage and the other of which is connected to means for producing a reference voltage comprising part of said feedback means, said feedback means including means for preventing the voltage at said first input from going negative even in response to a short at the output of said converting means.

27. A voltage power supply according to claim 26 wherein said inverting means includes means connected with said amplifier for disabling said inverting means and preventing it from producing a signal at its output if the input to the comparator decreases below a predetermined level.

28. A voltage power supply according to claim 23 wherein said voltage varying means includes a pull-up and pull-down circuit arrangement for producing said adjustable output voltage at its output.

29. A voltage power supply according to claim 23 wherein said voltage adjusting means includes means for producing a busy signal in response to and substantially only throughout the period during which the amplitude of said adjustable voltage changes from one level to another in response to said coded signal.

* * * * *